Oct. 22, 1935.  R. E. KLAGES ET AL  2,018,365
BALL JOINT
Filed Dec. 11, 1933  2 Sheets-Sheet 1
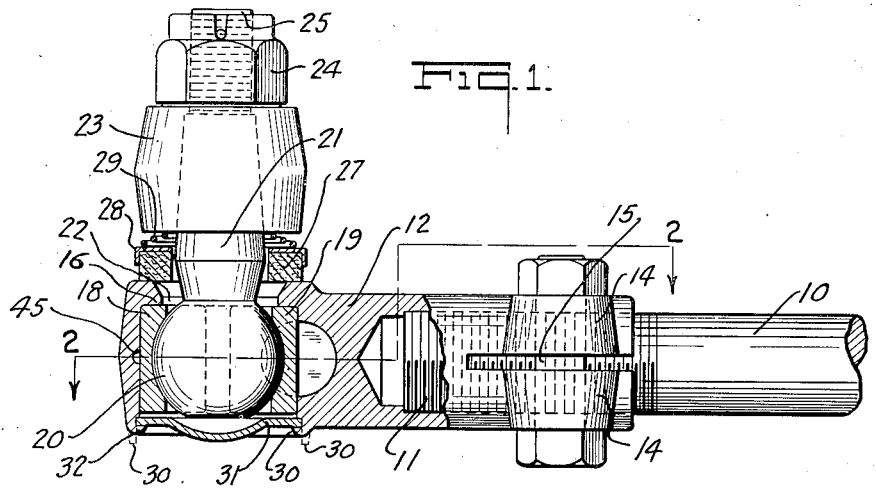
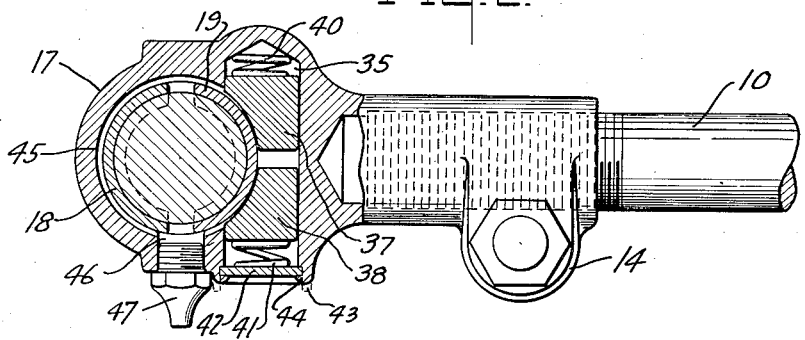
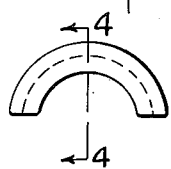
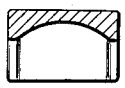
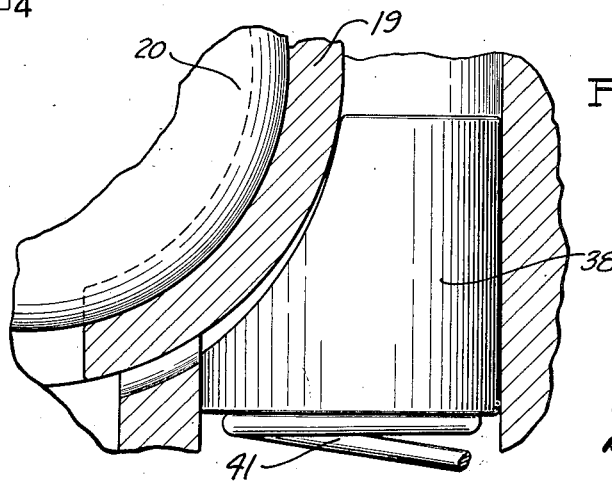
INVENTORS
Reynold E. Klages
BY William A. Flumerfelt
ATTORNEY

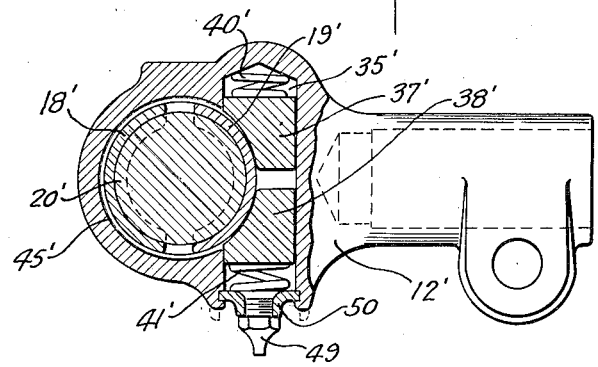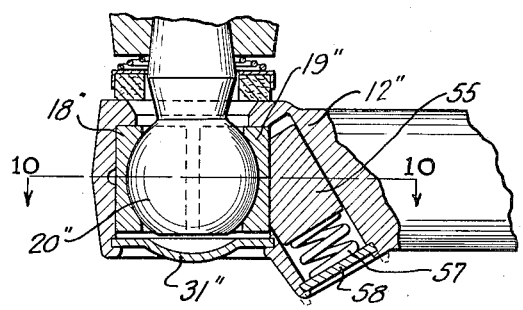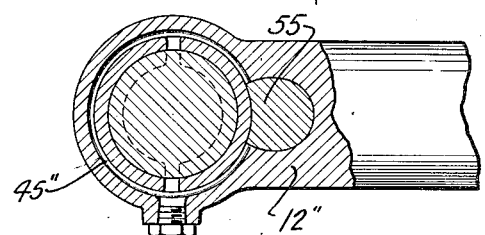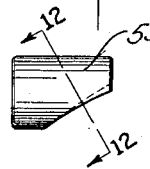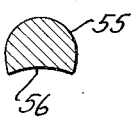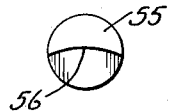

Patented Oct. 22, 1935

2,018,365

UNITED STATES PATENT OFFICE

2,018,365

BALL JOINT

Reynold E. Klages and William A. Flumerfelt, Columbus, Ohio, assignors to The Columbus Auto Parts Company, Columbus, Ohio, a corporation of Ohio Application December 11, 1933, Serial No. 701,742

5 Claims. (Cl. 287—90)

This invention relates to joints and particularly to those of a character known as ball joints and especially adapted for use in tie rod and drag link installations of automotive vehicles.

The invention contemplates the provision of a ball joint wherein the spherical portion of a ball stud rests between seats so as to obtain an enlarged bearing surface area coupled with means for urging the seats into engagement with the ball stud so that a substantially uniform pressure will be exerted upon the ball irrespective of wear.

The invention has for an object the provision of a ball joint wherein the number of parts are reduced to a minimum and are contained within a comparatively small space.

A further object is the provision of a ball joint of this character wherein the parts may be assembled without adjustment and wherein a substantially uniform bearing pressure is maintained automatically throughout the life of the joint.

A further object is the provision of a joint of this character wherein there is a minimum amount of machine work, a minimum number of parts and a simplification of assembly wherein the cost of the device is materially decreased and the work of assembly greatly facilitated.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view partly in section illustrating a form of joint of our invention;

Figure 2 is a top plan view, certain parts being shown in section of the parts illustrated in Figure 1;

Figure 3 is a top plan detailed view showing one of the ball seats or bearing portions;

Figure 4 is a sectional view through the bearing seat illustrated in Figure 3 taken on the line 4—4 of Figure 3;

Figure 5 is a detailed end view showing a ball seat engaging means;

Figure 6 is a detailed side view of the ball seat engaging member illustrated in Figure 5;

Figure 7 is an enlarged fragmentary detailed view showing the assembly of a ball seat and ball seat engaging member;

Figure 8 is a top plan view of a joint similar to Figure 2 illustrating a modified form of lubrication means;

Figure 9 is a fragmentary sectional view showing a modified form of ball joint of our invention;

Figure 10 is a sectional view taken substantially on the line 10—10 of Figure 9;

Figure 11 is a side elevational detailed view of a ball seat engaging member;

Figure 12 is a sectional view taken substantially on the line 12—12 of Figure 11;

Figure 13 is an end view of the ball seat engaging member illustrated in Figure 11.

While we have illustrated the joint of our invention as particularly adapted for tie rod end or joint connections, it is to be understood that we contemplate the use of the invention in any link or joint construction wherever the same may be found to be applicable.

Referring to the drawings, we have illustrated an arrangement of one end of a tie rod construction of our invention particularly adapted for use in connecting the pivotally mounted or steering wheels of a vehicle together, and in which numeral 10 illustrates a tie rod which is threaded as at 11 to receive a ball joint housing 12, the latter being preferably formed of metal in any suitable manner as by casting or forging. The housing 12 is provided with a bore threaded to receive the end 11 of the tie rod 10 and is also provided with a pair of laterally projecting bosses 14 adapted to receive a clamping screw 15 for causing the housing to tightly grip the threaded end of the tie rod.

The housing 12 is provided with an enlarged portion 17 provided with a cylindrical bore adapted to receive in the embodiment illustrated ball seats 18 and 19. The ball seats are formed with oppositely disposed concave surfaces to snugly engage the exterior surface of a ball or spherical portion 20 formed on the end of a stud 21. The stud portion 21 extends through an opening 22 in an upper wall of the housing and is received in an opening in an arm 23 which is to be joined through the ball joint to the tie rod 10, the arm or link 23 being held in position upon the stud 21 by means of a nut 24 engageable with the threaded portion 25 of the stud. The stud portion 21 is tapered so that the arm or link portion 23 is brought into close snug fit with the latter under the pressure of nut 24. A washer 27 of felt or other suitable oil sealing material engages the upper surface of the housing 12 and is held into contact therewith by means of a metal cup 28 and a spring 29 so as to prevent the leakage of lubricant and the ingress of water, dust and other foreign mater into the housing.

The lower end of the bore in the housing accommodating the ball seats 18 and 19 is formed as illustrated in dotted lines at 30, and receives a suitable plate 31 of sheet metal or other material to close the bore in the housing beneath the ball and the seats, the plate being held in position by swaging over as at 32 portions 30 of the housing. By this means the plate is fixedly and securely retained in position against removal or displacement. The ball seats 18 and 19 are prevented from upward movement by means of an annular shoulder 16 formed on the housing 12.

We have provided means for maintaining a substantially uniform or constant bearing pressure between the ball seats and the ball 20 of a nature which will automatically compensate for wear throughout the life of the joint. The means, as particularly illustrated in Figures 1 through 8, inclusive, comprises a bore 35 out of alignment with the bore in the housing receiving the ball seats 18 and 19, and arranged substantially at right angles to the axis of the first mentioned bore but so positioned as to intersect the latter. Slidably positioned within the bore 35 is a pair of cylindrical plungers or members 37 and 38 having curved or wedge-like surfaces to accommodate or engage the exterior curved surface of the ball seat 19. As particularly illustrated in Figure 7 the curvature on the plungers or wedges 37 and 38 is of a slightly greater radius than the radius of the exterior surface of the ball seat, the arrangement of parts and difference in curvature being especially illustrated in the enlarged view of the parts illustrated in Figure 7. Through such construction, any wear existing between the ball 20 and the seats 18 and 19 or between the seat 19 and the wedge members 37 and 38 will be automatically taken up by inward movement of the wedges 37 and 38 urging at all times the ball seat 19 into engagement with the ball 20 and in turn against the ball seat 18. Resilient means as, for example, a coil spring 40 is interposed between the member 37 and end of the bore 35 to at all times urge the wedge member 37 into contact with ball seat 19. Similarly, a spring 41 is positioned in contact with the end of member 38 to urge the latter into engagement with ball seat 19, the spring 41 resting against a plate 42 suitably held in the open end of bore 35 by means of the housing portions 43 illustrated in dotted lines in Figure 2, the latter being swaged over as illustrated at 44 to fixedly retain the plate, members 37, 38 and springs 40, 41 in assembled relationship. By means of the construction illustrated of opposed wedges, a lateral pressure is at all times present to hold the ball seats 18 and 19 into engagement with the ball 20 of the stud 21 and that wear of the parts is automatically compensated for by inward movement of the wedges 37 and 38 without any manual adjustment.

As particularly illustrated in Figures 1 and 2, lubricating means for the structure consists of a circumferential groove 45 in the interior wall of the bore in the housing which communicates with an opening 46 accommodating a fitting 47 adapted to receive a lubricator injector for the purpose of introducing lubricant through the fitting 47 and into the channel 45. In this manner the parts contained within the housing 12 are at all times kept well lubricated and by reason of the felt washer 27 the lubricant is confined within the interior portions of the housing adjacent the working parts of the joint.

In the form of the invention illustrated in Figure 8, the arrangement is provided with a lubricant fitting 49 which is retained in a closure plate 50 adapted to close the bore 35' in which are positioned the wedge members 37', 38' and springs 40' and 41'. In this form of the invention the interior wall of the housing 12' is provided with a groove 45' to facilitate the circulation of the lubricant around the ball seats 18' and 19' and the spherical end of the ball stud 20'.

In the form of the invention disclosed in Figures 9 to 13, inclusive, the housing 12'' is provided with seats 18'' and 19'' substantially the same in configuration as the seats 18 and 19 illustrated in the form of our invention portrayed in Figures 1 and 2, which receive the spherical end of the ball stud 20''. The lower portion of the bore in the housing 12'' is closed by means of a plate 31''. In this form of the invention a single wedge member 55 is employed and is arranged at an angle to the normal axis of the main bore of the housing 12'' containing seats 18'' and 19''. The wedge member 55 is provided with a concave wedging surface 56 which is complementary to the curved exterior surface of the ball seat 19' and is arranged in close or wedging engagement with the ball seat being urged to wedging position by means of spring 57, the latter being retained in place by plate 58 in the same manner as plate 42 is held in place in the form of the invention illustrated in Figures 1 and 2 of the drawings. In this form of the invention any wear which may occur between the ball seats and the housing and the seats and the ball stud 20'' is taken up by means of the wedge 55 which is urged toward wedging position by means of the spring 57 thus automatically taking care of any wear of the parts, yet permitting relative pivotal movement of the ball stud with respect to seats 18'' and 19''.

Any suitable lubrication means may be utilized as, for example, the groove 45'' similar to groove 45 which communicates with a lubricant fitting 47'' carried in the wall of the housing 12''.

It is apparent that, within the scope of the invention, modifications and different arrangements may be made other than is herein disclosed, and the present disclosure is illustrative merely, the invention comprehending all variations thereof.

What we claim is:—

1. A ball joint including a housing having a bore therethrough; a second bore in said housing having its axis arranged at an angle to the axis of said first mentioned bore; a ball stud havng a ball portion arranged in said first mentioned bore in the housing; ball seats having concave inner surfaces and being interposed between the surface of said ball and the walls of the first mentioned bore in said housing; a plunger arranged in said second mentioned bore, said plunger having a curved portion engageable with the exterior surface of one of said seats, said curved portion of said plunger being of a radius slightly greater than the radius of curvature of the exterior surface of said ball seat; and spring means for urging said plunger into engagement with the curved exterior surface of one of said ball seats.

2. A ball joint including a housing having a bore; a second bore in said housing having its axis arranged at an angle to the axis of said first mentioned bore; a stud having a ball portion arranged in said first mentioned bore in the housing; ball seats interposed between the surface of said ball and the walls of the first mentioned bore in said housing; a plunger arranged in said second mentioned bore, said plunger having a curved portion engageable with the exterior surfaces of one of said seats, said curved portion of said plunger being of a radius slightly greater than the radius of curvature of the exterior surface of said ball seat; spring means for urging said plunger into engagement with the curved exterior surface of one of said ball seats; and a plate closing an end of each of said bores having a portion of the housing swaged into contact therewith for holding the plates in fixed relation.

3. A ball joint including a housing having a bore therethrough; a second bore in said housing having its axis arranged at an angle to the axis of said first mentioned bore; a ball stud having a ball portion arranged in said first mentioned bore in the housing; ball seats having cylindrical outer surfaces and cup shaped inner surfaces interposed between the surface of said ball and the walls of the first mentioned bore in said housings; a substantially cylindrical plunger arranged in said second mentioned bore, said plunger having a curved portion engageable with the exterior surfaces of one of said seats, said curved portion of said plunger being of a radius slightly greater than the radius of curvature of the exterior surface of said ball seat; spring means for urging said plunger into engagement with the curved exterior surface of one of said ball seats; and a sheet metal plate in each of said openings having a portion of the housing swaged into contact therewith for holding the plates in fixed relation.

4. A joint comprising a housing having a cylindrical bore therein; a stud having a ball portion extending into said bore; ball seats having cylindrical exterior portions interposed between said ball portion and the walls of the bore in said house; a second bore in said housing arranged substantially at right angles to the axis of said first mentioned bore and out of alignment therewith, said bores intersecting one another; a pair of plungers arranged in said bore and engageable with one of said ball seats; spring means for urging the seats into engagement with said ball; said plungers having curved surfaces of slightly greater radius than the radius of curvature of said ball seats whereby wear of said ball and seats may be automatically taken up by relative movement of said cylindrical plungers.

5. A ball joint comprising a ball stud having a spherical portion; a housing for a spherical portion of said stud having an opening therethrough to accommodate a spherical portion; a second opening intersecting said first named opening; ball seats in the first mentioned opening in said housing engageable with the spherical portion of said stud; and a member in said second opening engageable with one of said ball seats for retaining said seat in engagement with the spherical portion of said stud, means for lubricating said joint including a groove in the interior wall of one of said housing openings, and a fitting communicating with said groove for the introduction of lubricant.

REYNOLD E. KLAGES.
WILLIAM A. FLUMERFELT.